United States Patent
Davenport

(10) Patent No.: US 10,272,349 B2
(45) Date of Patent: Apr. 30, 2019

(54) DIALOG SIMULATION

(71) Applicant: Isaac Davenport, Longmont, CO (US)

(72) Inventor: Isaac Davenport, Longmont, CO (US)

(*) Notice: Subject to any disclaimer, the term of this patent is extended or adjusted under 35 U.S.C. 154(b) by 244 days.

(21) Appl. No.: 15/258,609

(22) Filed: Sep. 7, 2016

(65) Prior Publication Data

US 2018/0065054 A1 Mar. 8, 2018

(51) Int. Cl.
A63H 3/28 (2006.01)
A63H 5/00 (2006.01)
G06F 17/27 (2006.01)
G06N 7/00 (2006.01)

(52) U.S. Cl.
CPC .......... *A63H 3/28* (2013.01); *A63H 5/00* (2013.01); *G06F 17/279* (2013.01); *G06N 7/005* (2013.01); *A63H 2200/00* (2013.01)

(58) Field of Classification Search
None
See application file for complete search history.

(56) References Cited

U.S. PATENT DOCUMENTS

| | | | |
|---|---|---|---|
| 4,857,030 A | 8/1989 | Rose | |
| 5,147,237 A | 9/1992 | Kwan et al. | |
| 5,358,259 A * | 10/1994 | Best | A63F 13/005 463/31 |
| 5,746,602 A * | 5/1998 | Kikinis | A63H 3/48 369/30.02 |
| 5,805,784 A | 9/1998 | Crawford | |
| 5,893,720 A * | 4/1999 | Cohen | G09B 19/04 434/156 |
| 6,227,931 B1 * | 5/2001 | Shackelford | A63H 3/52 434/156 |
| 6,309,275 B1 | 10/2001 | Fong et al. | |
| 6,631,351 B1 * | 10/2003 | Ramachandran | G10L 13/00 704/10 |
| 6,648,719 B2 | 11/2003 | Chan | |
| 7,252,572 B2 | 8/2007 | Wright et al. | |
| 7,297,044 B2 | 11/2007 | Small et al. | |
| 7,840,668 B1 * | 11/2010 | Sylvain | A63F 13/87 345/419 |

(Continued)

OTHER PUBLICATIONS

Elan Ruskin; 'Rule Databases for Contextual Dialog and Game Logic';Game Developers Conference 2012; Mar. 5, 2012; San Francisco, CA.

*Primary Examiner* — Thuykhanh Le
(74) *Attorney, Agent, or Firm* — MP Patents, LLC

(57) ABSTRACT

A method of producing simulated dialog outputs selected phrases in a sequence defined by a selected dialog model. When a state change is recorded one or more of dialog models which have non-zero state change type weights corresponding to the recorded state change type are identified and one of the identified dialog models is selected probabilistically with influence from the non-zero state change type weights. One or more unique characters are mapped to character indices of the selected dialog model and one or more phrases defined in the one or more mapped unique characters are identified which have non-zero phrase type weights corresponding to the phrase types of the selected dialog model. For each phrase type defined in the selected dialog model, at least one of the phrases are selected probabilistically with influence from the non-zero phrase type weights.

18 Claims, 13 Drawing Sheets

(56) References Cited

U.S. PATENT DOCUMENTS

| | | |
|---|---|---|
| 8,082,499 B2 | 12/2011 | Hudson et al. |
| 8,172,637 B2 | 5/2012 | Brown |
| 8,540,546 B2* | 9/2013 | Lipman .................. A63H 3/28 |
| | | 446/175 |
| 8,795,022 B2 | 8/2014 | Lipman et al. |
| 8,827,761 B2 | 9/2014 | Lipman et al. |
| 2003/0003839 A1* | 1/2003 | Lin ....................... A63H 30/04 |
| | | 446/175 |
| 2003/0220796 A1* | 11/2003 | Aoyama ................ G10L 15/22 |
| | | 704/275 |
| 2004/0066401 A1* | 4/2004 | Bushey ................. G06Q 10/06 |
| | | 715/744 |
| 2004/0066416 A1* | 4/2004 | Knott .................... G06Q 10/06 |
| | | 715/797 |
| 2004/0093118 A1* | 5/2004 | Sabe ....................... A63H 3/28 |
| | | 700/245 |
| 2005/0171640 A1* | 8/2005 | Sabe ..................... G06N 3/008 |
| | | 700/245 |
| 2006/0122837 A1* | 6/2006 | Kim ...................... G10L 15/22 |
| | | 704/270.1 |
| 2006/0155765 A1* | 7/2006 | Takeuchi ......... G06F 17/30654 |
| 2006/0287868 A1* | 12/2006 | Ikeda .................... G10L 15/22 |
| | | 704/275 |
| 2008/0010070 A1* | 1/2008 | Kim ....................... G10L 13/10 |
| | | 704/259 |
| 2010/0041304 A1* | 2/2010 | Eisenson ................. A63H 3/28 |
| | | 446/297 |
| 2010/0332231 A1* | 12/2010 | Nakano ................ G10L 15/063 |
| | | 704/254 |
| 2012/0116584 A1* | 5/2012 | Kim ....................... B25J 9/1656 |
| | | 700/246 |
| 2013/0257877 A1* | 10/2013 | Davis ..................... A63F 13/12 |
| | | 345/473 |
| 2013/0288563 A1* | 10/2013 | Zheng ..................... A63H 3/36 |
| | | 446/268 |
| 2014/0032467 A1 | 1/2014 | Reddy et al. |
| 2014/0032471 A1 | 1/2014 | Reddy et al. |
| 2014/0170929 A1* | 6/2014 | Lipman .................... A63H 3/00 |
| | | 446/175 |
| 2015/0133025 A1* | 5/2015 | Ponomarev ............. A63H 3/28 |
| | | 446/484 |
| 2015/0154492 A1* | 6/2015 | Ponomarev ............. H04W 4/70 |
| | | 706/11 |
| 2017/0106539 A1* | 4/2017 | Maisonnier ............ G10L 15/22 |
| 2017/0113348 A1* | 4/2017 | Monceaux ............. B25J 9/1661 |
| 2017/0113353 A1* | 4/2017 | Monceaux ........... G10L 13/027 |
| 2017/0125008 A1* | 5/2017 | Maisonnier ........... B25J 11/003 |
| 2017/0185085 A1* | 6/2017 | Storfer ................. G05D 1/0212 |

\* cited by examiner

DIALOG SIMULATION

SUMMARY

The present disclosure seeks to provide a method of producing simulated dialog. The method includes, defining each of a plurality of unique characters in terms of a plurality of phrases each weighted according to one or more phrase type weights and defining each of a plurality of dialog models in terms of state change type weights, character indices and phrase types. A state change type is recorded, one or more of the dialog models which have non-zero state change type weights corresponding to the recorded state change type are identified and one of the identified dialog models is selected probabilistically with influence from the non-zero state change type weights. One or more of the unique characters are mapped to the character indices of the selected dialog model. One or more phrases defined in the one or more mapped unique characters which have non-zero phrase type weights corresponding to the phrase types of the selected dialog model are identified and, for each phrase type defined in the selected dialog model, at least one of the plurality of phrases defined in the one or more mapped unique characters is selected probabilistically with influence from the non-zero phrase type weights. The selected phrases are output in a sequence defined by the selected dialog model.

The present disclosure also seeks to provide a system for producing simulated dialog. The system includes a memory, a processor and an output. The memory has, recorded thereto, a dialog simulator including computer-readable definitions of each of a plurality of unique characters in terms of a plurality of phrases each weighted according to one or more phrase type weights; computer-readable definitions of each of a plurality of dialog models in terms of state change type weights, character indices and phrase types; and a dialog engine including computer readable instructions for producing a simulated dialog. The processor is configured to, according to computer readable instructions of the dialog engine, record a state change type; identify one or more of the dialog models which have non-zero state change type weights corresponding to the recorded state change type of the simulator; select one of the identified dialog models probabilistically with influence from the non-zero state change type weights; map one or more of the unique characters to the character indices of the selected dialog model; identify one or more phrases defined in the one or more mapped unique characters which have non-zero phrase type weights corresponding to the phrase types of the selected dialog model; select, for each phrase type defined in the selected dialog model, at least one of the plurality of phrases defined in the one or more mapped unique characters probabilistically with influence from the non-zero phrase type weights. The output is configured to present the selected phrases in a sequence defined by the selected dialog model.

BRIEF DESCRIPTION OF THE FIGURES

The summary above, as well as the following detailed description of illustrative embodiments, is better understood when read in conjunction with the appended drawings. For the purpose of illustrating the present disclosure, example constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

DETAILED DESCRIPTION

Figure 1:
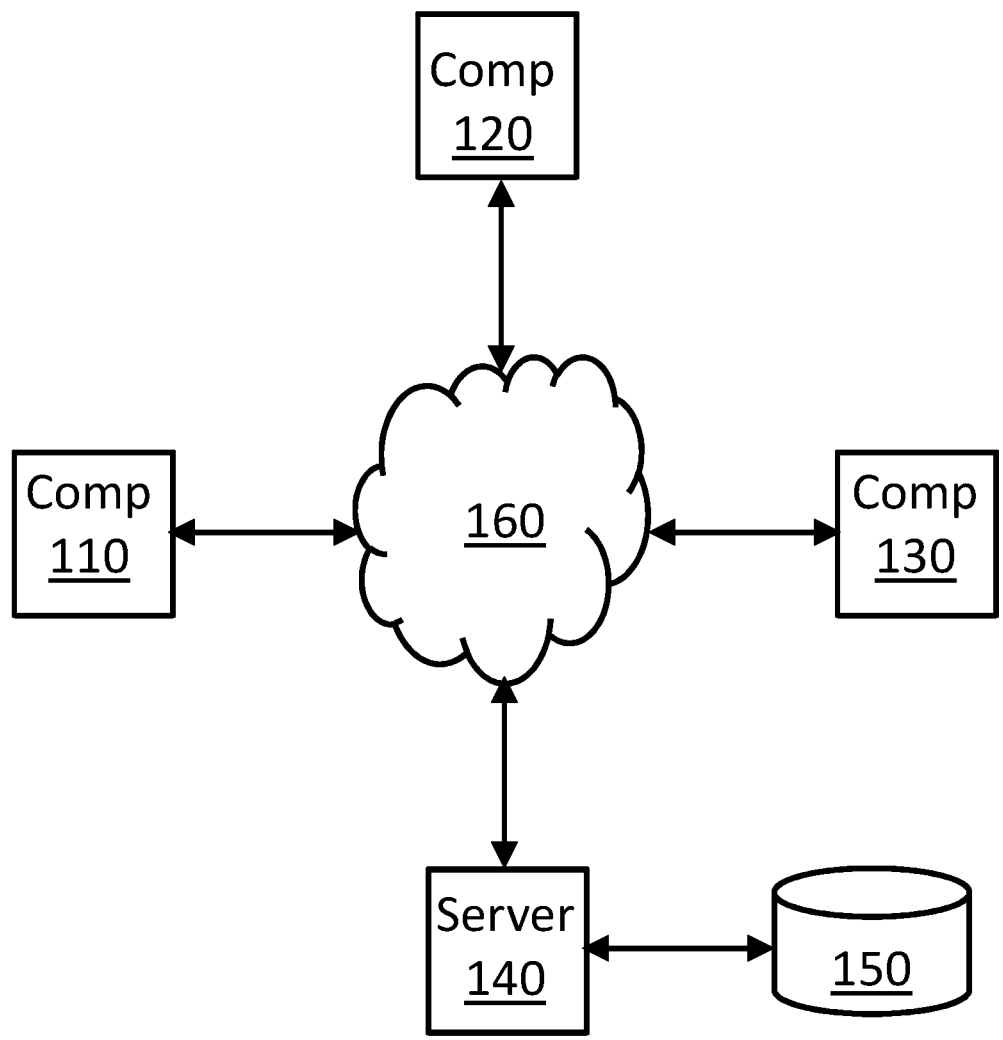
FIG. 1 schematically illustrates an example network environment that is suitable for facilitating disclosed systems and methods.

The following detailed description illustrates embodiments of the disclosure and manners by which they may be implemented. Although the best modes of carrying out the present systems, methods and services have been disclosed, those skilled in the art would recognize that other embodiments for carrying out or practicing the disclosure are also possible.

It should be noted that the terms "first", "second", and the like, herein do not denote any order, quantity, or importance, but rather are used to distinguish one element from another. Further, the terms "a" and "an" herein do not denote a limitation of quantity, but rather denote the presence of at least one of the referenced item.

Embodiments of the present disclosure substantially eliminate, or at least partially address, problems in the prior art, enabling various combinations of phrase types to be traded back and forth in small conversations without the need for scripted dialog. With the benefit of disclosed dialog models, writers do not have to know one another or be aware of characters written by others in order for the characters to simulate a dialog. Writers simply create phrases for their character that match some phrase types defined in established dialog models. While character phrases need not be audible, when character phrases are intended to be audible, a voice actor may record the phrases for a character.

Disclosed systems and methods allow characters to come alive and talk with one another. In one example, by giving each of a number of toys a character and a voice, a dialog may be simulated amongst the toys. Dialog engines implement dialog models and character phrases so that toys talk and interact with one another based on input from the user. In another example, disclosed dialog engines may be used to generate conversations between non-player characters in a video game environment. Thousands of unique dialogs are possible based on only a couple of hundred recorded sentences or phrases per character. Interaction is enabled between characters, even though they may have been written and recorded without knowledge of one another.

The disclosed dialog engine framework allows for many independent contributors to generate characters who can all interact with one another in either a fully unscripted and context free style, in a fully scripted style when the characters have been developed together or any style along the spectrum between unscripted to scripted. Dialog models and character phrase lists may be regularly updated to keep the characters fresh and outputting new phrases over the life of the character.

Using the state feature, dialog models may even be constructed and linked to allow the user to make decisions by changing the position of characters to guide the narrative as their selected branches of the adventure story unfold akin to the "Choose Your Own Adventure" series published by Bantam Books and later Chooseco.

Additional aspects, advantages, features and objects of the present disclosure will be made apparent from the drawings and the detailed description of the illustrative embodiments construed in conjunction with the appended claims that follow. It will be appreciated that features of the present disclosure are susceptible to being combined in various combinations without departing from the scope of the present disclosure as defined by the appended claims.

FIG. 1 schematically illustrates an example network environment that is suitable for facilitating various systems and methods for producing simulated dialog in accordance with disclosed dialog simulation services. The network environment includes one or more computing devices, depicted as a computing device 110, a computing device 120 and a computing device 130 (hereinafter collectively referred to as computing devices 110). The network environment also includes a server 140 a database 150 associated with the server 140 and a communication network 160.

The network environment may be implemented in various ways, depending on various possible scenarios. In one example scenario, the network environment may be implemented by way of a spatially collocated arrangement of the server 140 and the database 150. In another example scenario, the network environment may be implemented by way of a spatially distributed arrangement of the server 140 and the database 150 coupled mutually in communication via the communication network 160. In yet another example scenario, the server 140 and the database 150 may be implemented via cloud computing services.

The computing devices 110 are coupled in communication with the server 140 via the communication network 160. The communication network 160 can be a collection of individual networks, interconnected with each other and functioning as a single large network. Such individual networks may be wired, wireless, or a combination thereof. Examples of such individual networks include, but are not limited to, Local Area Networks (LANs), Wide Area Networks (WANs), Metropolitan Area Networks (MANs), Wireless LANs (WLANs), Wireless WANs (WWANs), Wireless MANs (WMANs), the Internet, second generation (2G) telecommunication networks, third generation (3G) telecommunication networks, fourth generation (4G) telecommunication networks, and Worldwide Interoperability for Microwave Access (WiMAX) networks.

Examples of the computing devices 110 include, but are not limited to, mobile phones, smart telephones, Mobile Internet Devices (MIDs), tablet computers, Ultra-Mobile Personal Computers (UMPCs), phablet computers, Personal Digital Assistants (PDAs), web pads, Personal Computers (PCs), handheld PCs, laptop computers, desktop computers, Network-Attached Storage (NAS) devices, large-sized touch screens with embedded PCs, and interactive entertainment devices, such as game consoles, Television (TV) sets and Set-Top Boxes (STBs).

The server 140 may be configured to store dialog simulation data in the database 150. The dialog simulation data may, for example, include character definitions, dialog model definitions, state changes or motion changes. Optionally, the computing devices 110 may access the server 140 to download the character definitions, dialog model definitions, a dialog simulator or one or more other software products associated with disclosed dialog simulation services or a combination of these.

The server 140 may be configured as a dialog server arranged to transmit, over a communications network such as 160, definitions of each of a plurality of unique characters including a plurality of phrases associated with one or more phrase type weights. The server 140 may also be arranged to transmit definitions of a plurality of dialog models over a communications network, including state change type weights, character indices and phrase types.

In one embodiment, disclosed systems are arranged in a manner such that their functionality is implemented partly in the computing devices 110 and partly in the server 140. In another embodiment, the systems are arranged in a manner such that functionality is implemented substantially in the computing devices 110 by way of downloaded software products such as a dialog simulator to be described below. In such a scenario, the computing devices 110 may be coupled to the server 140 periodically or randomly from time to time, for example, to receive character definitions, dialog model definitions, or updates from the server 140 and/or to upload status or state to the server 140. In yet another embodiment, the systems are arranged in a manner such that their functionality is implemented substantially in the server 140.

Users associated with the computing devices 110 use the dialog simulation service. Accordingly, some of the computing devices 110 may be used, operated, or carried by consumers of a dialog simulation service. Optionally, some of the computing devices 110 may be used, operated, or carried by technicians for the service.

The dialog simulation service can be offered free of cost or can be a paid service that has a one-time purchase fee or a subscription-based or a transaction-based billing, such as pay-per-use and pay-per-feature.

FIG. 1 is merely an example, which should not unduly limit the scope of the claims herein. It is to be understood that the specific designation for the network environment is provided as an example and is not to be construed as limiting the network environment to specific numbers, types, or arrangements of computing devices, servers, databases and communication networks. A person skilled in the art will recognize many variations, alternatives, and modifications of embodiments of the present disclosure.

Figure 2:
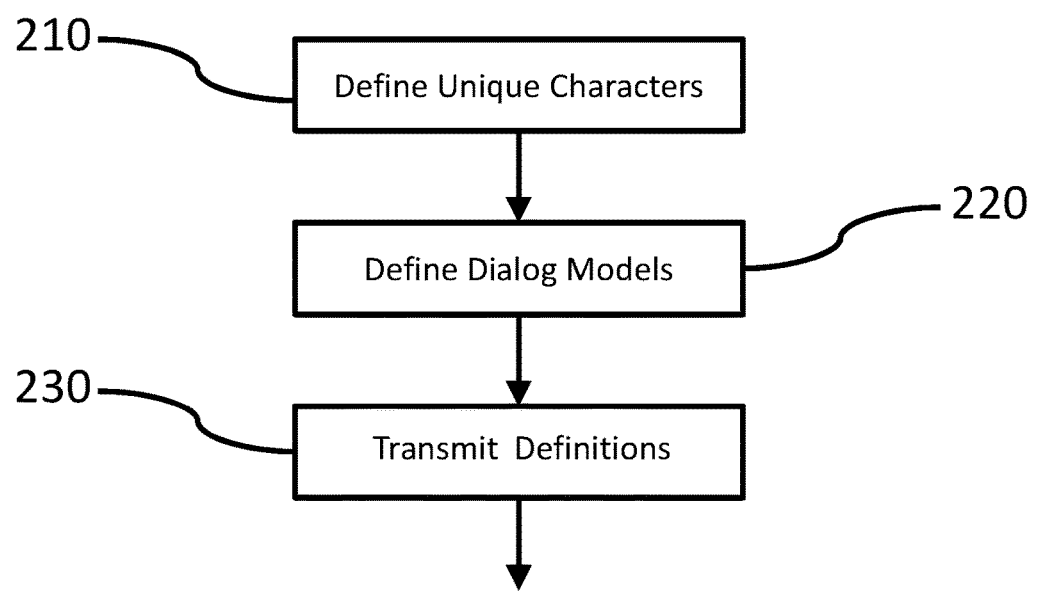
FIG. 2 illustrates a flow diagram of an example process for establishing character definitions and dialog model definitions in accordance with a disclosed method for producing a simulated dialog.

FIG. 2 illustrates a flow diagram of an example process for establishing character definitions and dialog model definitions in accordance with an embodiment of the present disclosure. The method is depicted as a collection of actions in a logical flow diagram, which represents a sequence of actions that may be implemented in hardware, software, or a combination thereof.

The method includes, defining, at 210, each of a plurality of unique characters in terms of a plurality of phrases each weighted according to one or more phrase type weights and defining, at 220, each of a plurality of dialog models in terms of state change type weights, character indices and phrase types. It should be noted that a method or system employing state change types will also be able to act according to one or more states since a state change type of 'none' implies that the system, environment or components thereof reside or remain in a given state.

At 230, definitions of the defined plurality of unique characters and definitions of the defined dialog models are transmitting over a communications network. Transmission of character definitions and dialog model definitions can be implemented through a network environment as set forth above or similar such that the character definitions and dialog model definitions are transmitted from a server to a user computing device. In an example, definitions may be transmitted over the internet.

The actions 210 to 230 are only illustrative and other alternatives can also be provided where one or more actions are added, one or more actions are removed, or one or more actions are provided in a different sequence without departing from the scope of the claims herein.

Characters, as may be defined in accordance with action 210 above, are a collection of phrases associated with some character metadata such as age and gender. Each "phrase" is something a character may say or otherwise output and could be as short as a word, or as long as a few paragraphs. A phrase may be a complete utterance of a statement that can elicit a response, or may be a complete response to another type of phrase. In an example, the phrases may be recorded by a character actor such as a voice actor including but not limited to a professional, an amateur or an end user who voices phrases for a character.

Figure 3:
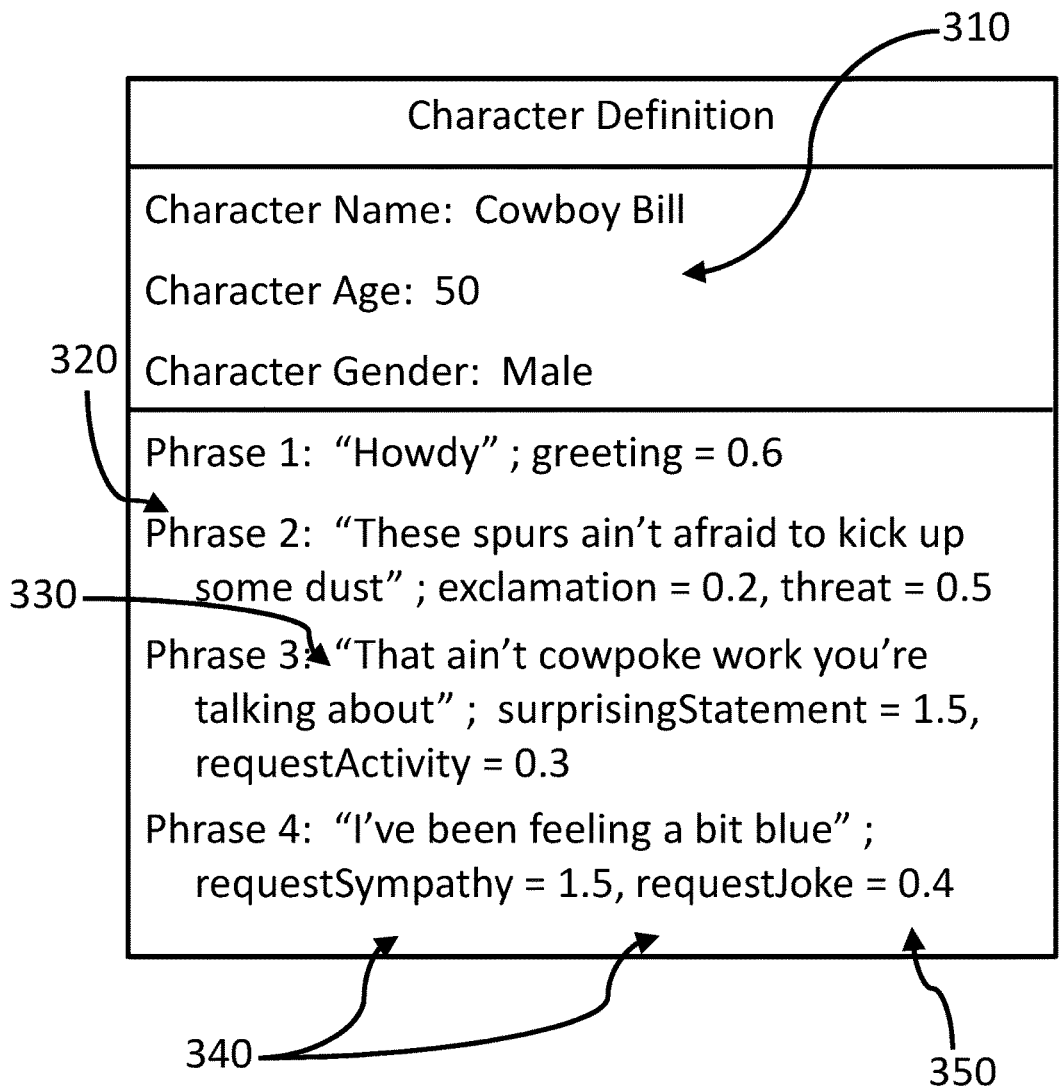
FIG. 3 illustrates an example character definition.

FIG. 3 illustrates an example character definition. The example "cowboy" character defined in FIG. 3 includes character metadata 310 having information such as character name, character age and character gender. Any of a variety of information may be incorporated into metadata 310. Phrase identifiers or indices 320 each designate a phrase 330, one or more phrase types 340 into which the phrase may be classified, as well as phrase type weights 350. Character-specific phrases, character-specific phrase types and character-specific phrase type weights may be stored in a character-specific phrase table as part of a character definition.

Phrase weightings or phrase type weights may be implemented in a weighted random selection process and represent a probability the phrase with which they are associated will be output as the phrase type referenced, cited or otherwise called in a dialog model (described below). According to this process, candidate phrase types with larger weights are more likely to be selected than candidates with small weights. For example, referring to FIG. 3, the cowboy character's phrase "That ain't cowpoke work you're talking about" could be weighted a 1.5 as a surprising statement, and a 0.3 as a request for activity. According to these example weights, the phrase has a higher probability of being output as a surprising statement than as a request for activity. Weights of zero or the absence of a weight results in a candidate having zero probability. Weights could be stored in any of a variety of number formats including but not limited to fixed or floating point.

Example phrase types include but are not limited to greetings, requests for sympathy, or statements about location. Hundreds of phrase types are possible and the number may grow over the duration of the dialog simulation service. Therefore, efficient storage strategies include sparse matrix storage of non-zero weights. Table 1 gives examples of possible phrase types.

TABLE 1

| Phrase Types | | |
|---|---|---|
| exclamation | greeting | request for sympathy |
| a "yes" response | a "no" response | a yes no question |
| a surprising statement | a request for a joke | a request for sympathy |
| giving sympathy | telling a joke | a threat |
| a retreating statement | an advancing statement | an insult |
| request of advice | give advice | request a location |
| give a location | a ramble | request to catch up |
| a statement of recent activities | an expression of disbelief | schoolboy-cowboy script1A |
| schoolboy-cowboy script1B | schoolboy-cowboy script1C | schoolboy-cowboy script1D |
| express dismay | negative internal thought | positive internal thought |

Defining characters may include storing, as a data object to a non-transient memory, character meta data arranged with a plurality of phrases each weighted according to one or more phrase type weights.

FIG. 3 is merely an example, which should not unduly limit the scope of the claims herein. It is to be understood that the specific designation for the character definition is provided as an example and is not to be construed as limiting the character definitions to specific types, or arrangements of character metadata, character phrases and other character information. A person skilled in the art will recognize many variations, alternatives, and modifications of embodiments of the present disclosure.

A dialog model is defined by state change type weights, character indices and phrase types and is provided to program a dialog in the form of a sequence of phrases output by one or more characters which are selected according to the dialog model and states or state changes of a simulation environment. The simulation environment may include a physical space occupied by one or more objects such as toys, may include aspects of the virtual reality of a video game, may include the operating state of system for producing simulated dialog or a combination of these.

Figure 4:
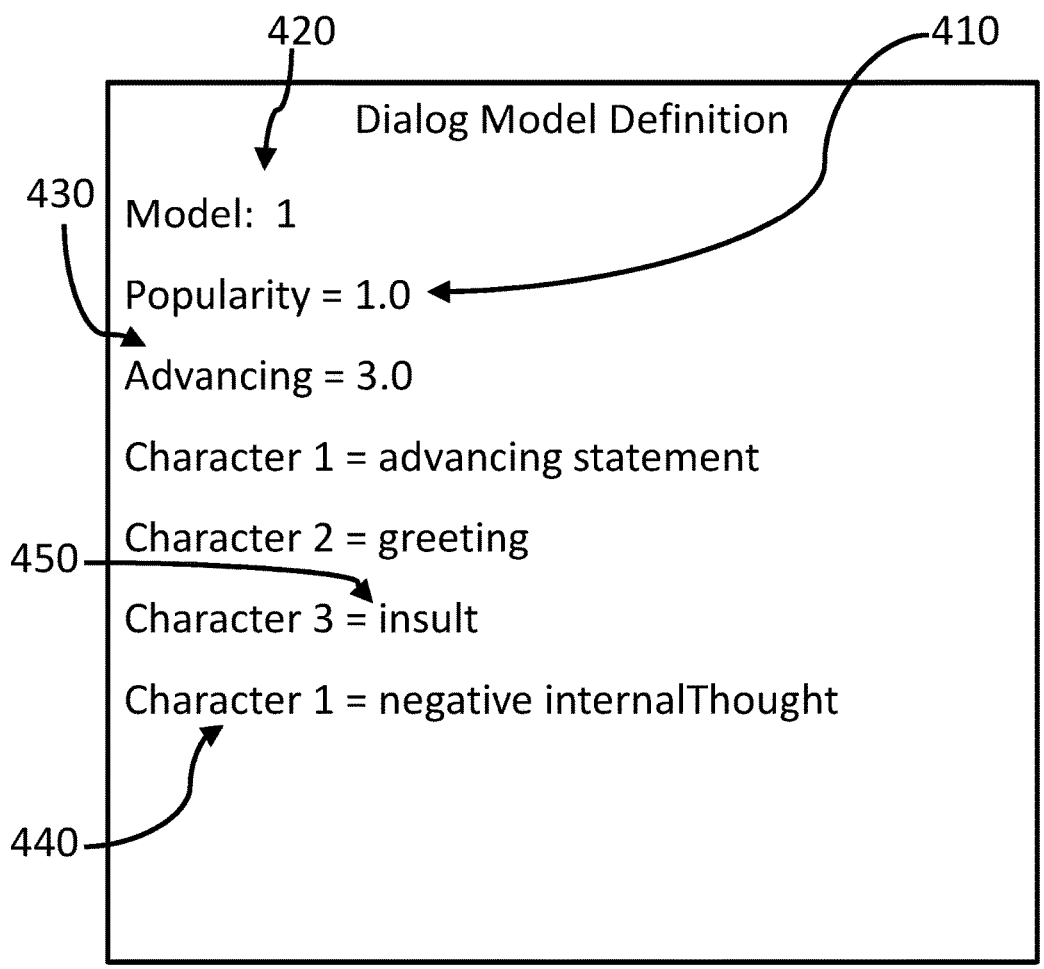
FIG. 4 illustrates an example dialog model definition.

FIG. 4 illustrates an example dialog model definition. A model indicator or model index 420 designates a dialog model as number 1 while the popularity ranking 410 of the dialog model (1.0) and the state 430 in which the dialog model may be used (advancing=3.0) influence when the dialog model is selected for generating a dialog. As discussed in greater detail below, a dialog model selection may be made in response to a change of state in, for example, a dialog simulation environment, or a character or in response to a location or motion of an object.

A number of character indices 440 define which phrase types 450 are output by the character chosen for the index. For example, referring to FIG. 4, a character selected for character index 1 outputs an advancing statement phrase from among the phrases of that type defined for that character, then a second character mapped to character index 2 outputs a greeting phrase from among the phrases of that type defined for the second character and then a third character mapped to character index 3 outputs an insult phrase from among the phrases of that type defined for the third character, etc. Each phrase will be output from the character definition mapped to the given character index. For example, the cowboy character described with reference to FIG. 3, as mapped to the character index 2 may output "Howdy!" as required by the "greeting" phrase type associated with character index 2 in this dialog model definition.

Figure 5:
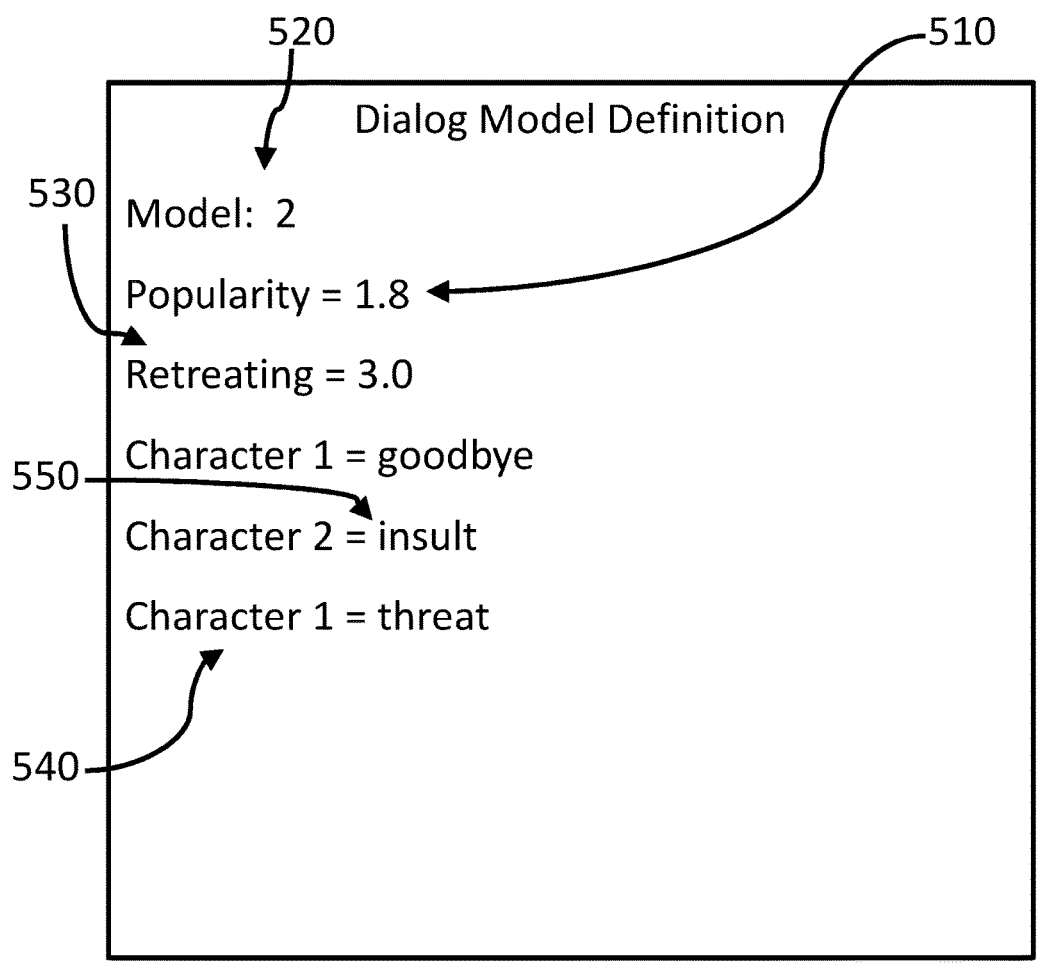
FIG. 5 illustrates another example dialog model definition.

FIG. 5 illustrates another example dialog model definition. Model index 520 indicates the depicted dialog model definition is dialog model 2, which has a popularity ranking 510 of 1.8 and a use state 530 of retreating=3.0. Character indices 540 call for 1st and 2nd characters such that the phrase types 550 are output sequentially as a goodbye, an insult and a threat. For example, referring to FIG. 5, a character mapped to character index 1 outputs a goodbye phrase from among the phrases of that type defined for that character, then a second character mapped to character index 2 outputs an insult phrase from among the phrases of that type defined for the second character, etc.

Figure 6:
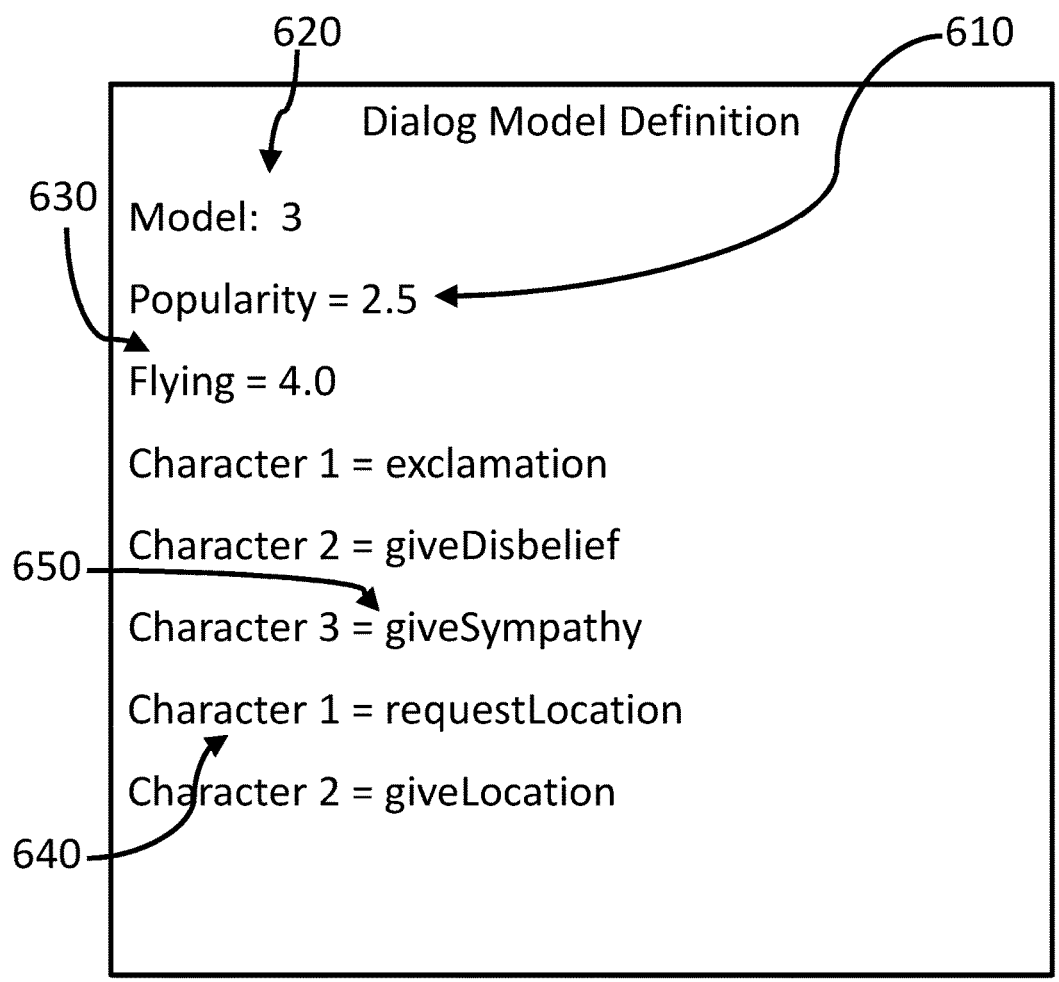
FIG. 6 illustrates yet another example dialog model definition.

FIG. 6 illustrates yet another example dialog model definition. Model index 620 indicates the depicted dialog model definition is dialog model 3, which has a popularity ranking 610 of 2.5 and a use state 630 of flying=4.0. Character indices 640 call for 1st, 2nd and 3rd characters such that the phrase types 650 are output sequentially as an exclamation, an expression of disbelief, an expression of sympathy, a request for location and an expression of location. For example, referring to FIG. 6, a character mapped to character index 1 outputs a goodbye phrase from among the phrases of that type defined for that character, then a second character mapped to index 2 outputs an insult phrase from among the phrases of that type defined for the second character, etc.

As with defining characters, defining dialog models may include storing, as a data object to a non-transient memory, dialog model identifiers arranged with state change type weights, character indices and phrase types.

When selected by a dialog engine as described in greater detail below, character definitions and dialog model definitions may be implemented as part of a system for producing or generating synthetic, simulated or artificial dialog, a method for producing or generating synthetic, simulated or artificial dialog, a service for producing or generating synthetic, simulated or artificial dialog or a combination of these. Similarly, the character definitions and dialog model definitions may contribute to a dialog simulation system, a dialog simulation environment, a dialog simulation method, a dialog simulation service or any combination of these.

FIGS. 4-6 are merely examples, which should not unduly limit the scope of the claims herein. It is to be understood that the specific designation for the dialog models are provided as examples and are not to be construed as limiting the dialog models to specific, types, or arrangements of character indices, phrase types or other dialog information. A person skilled in the art will recognize many variations, alternatives, and modifications of embodiments of the present disclosure.

In one example the group of available phrases for each character as well as the set of dialog models are static. In another example, updates to the group of available phrases for characters as well as additional dialog models may be acquired over the internet or other communications network, for example, with the support of a subscription manager or dialog server implemented in hardware and/or software, for example, as a software module running on server 140.

With the addition of new phrase types, existing characters may be updated so that existing character phrases are classified with non-zero weightings for the new phrase types. Then, the updated characters are able to participate in new dialog models that use the new phrase types.

Figure 7:
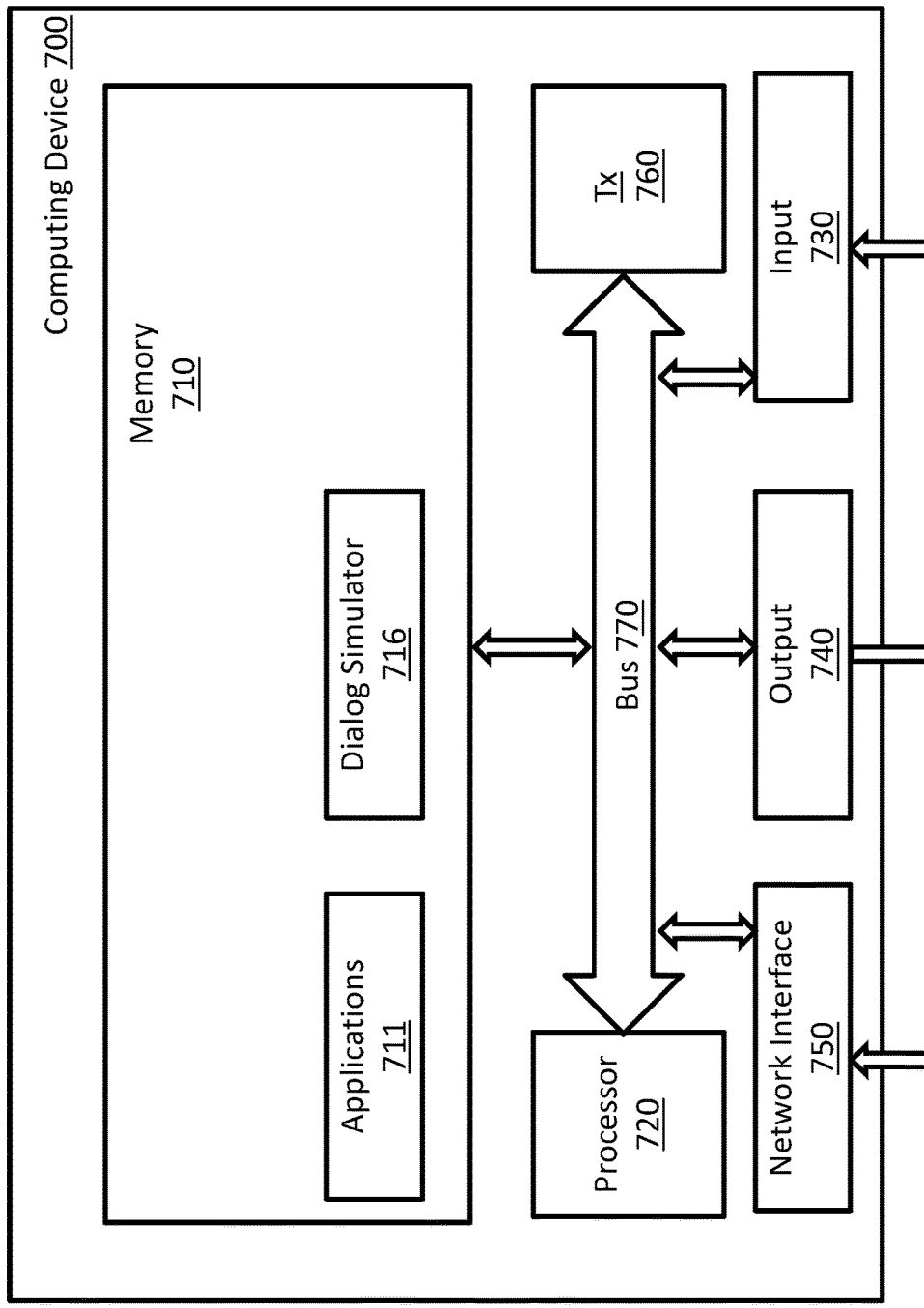
FIG. 7 schematically illustrates an example computing device useable as part of an example dialog simulation system.

FIG. 7 schematically illustrates an example computing device useable as part of an example dialog simulation system. The computing device 700 could be implemented as the computing devices 110, and vice versa. The computing device 700 includes, but is not limited to, a memory 710, computing hardware such as a processor 720, one or more input devices 730, one or more output devices 740, a network interface 750, a configuration of transceivers 760, and a system bus 770 that operatively couples various components including the memory 710, the processor 720, the input devices 730, the output devices 740, the network interface 750 and a configuration of transceivers 760.

The output devices 740 may include but are not limited to a display screen for presenting graphical images to a user of the computing device 700 and a speaker for providing audio output to the user. In some examples, a display screen may additionally function as an input device 730 as with, for example, touch screens.

The computing device 700 also includes a power source for supplying electrical power to the various components of the computing device 700. The power source may, for example, include a rechargeable battery.

The memory 710 optionally includes non-removable memory, removable memory, or a combination thereof. The non-removable memory, for example, includes Random-Access Memory (RAM), Read-Only Memory (ROM), flash memory, or a hard drive. The removable memory, for example, includes flash memory cards, memory sticks, or smart cards.

The memory 710 stores a dialog simulator 716 including or using a plurality of dialog models and character phrase tables as well as logic for stepping through dialog models, speaking characters, and character phrases within a dialog model, based on a combination of state change data and weighted random selection.

As mentioned above, in some examples, the display screen may be a touch-sensitive display screen that is operable to receive tactile inputs from the user. These tactile inputs may, for example, include clicking, tapping, pointing, moving, pressing and/or swiping with a finger or a touch-sensitive object like a pen.

Additionally or alternatively, the input devices 730 may include a mouse or a joystick that is operable to receive inputs corresponding to clicking, pointing, and/or moving a pointer object on the graphical user interface as well as a keyboard that is operable to receive inputs corresponding to pushing certain buttons on the keyboard. Additionally, the input devices may also include a microphone for receiving an audio input from the user.

Moreover, the transceivers 760 may include but are not limited to infrared transceivers, radio transceivers and combinations thereof. In some examples, the dialog simulator 716 may be interfaced with the transceivers 760. When executed on processor 720 the dialog simulator 716 is configured to resolve and integrate inputs from the transceivers 760 into useful information about at least one of: proximity, motion and orientation.

In some examples, computing device 700 may further include one or more sensors (not shown) which include but are not limited to one or more of: an accelerometer, a magnetometer, a pressure sensor, a temperature sensor, a gyroscopic sensor, a Global Positioning System (GPS) sensor, or a timer. The sensors may be used to measure and collect data related to surroundings of the computing device 700 or related to the dialog simulation environment or one or more objects within the dialog simulation environment. The sensors may include a timer for including time-stamps with any of various sensory inputs. Alternatively, processor 720 may provide system time as reference for including the time-stamps.

In some examples, the dialog simulator 716 may be interfaced with the sensors. When executed on processor 720, the dialog simulator 716 may be configured to resolve and integrate the outputs of the sensors into useful information about, for example, simulation environment state changes or character state changes. In an example the sensors include a motion detector, tilt switch, inertial measurement unit or other motion sensing device enabled for detecting specific movements of an object such as shaking or throwing.

Moreover, the memory 710 is a non-transient data storage medium and the dialog simulator 716, when executed by the processor 720, is optionally coupled to the memory 710, so that dialog simulation information is substantially continuously recorded and updated in the memory 710. The dialog simulation information may, for example, include at least one of: state data such as dialog simulation environment states, state change data, state change type data, motion data, motion type data and identifier codes or states.

Furthermore, the network interface 750 optionally allows the computing device 700 to upload the dialog simulation information to the server 140, for example, via the communication network 160. Additionally, the network interface 750 may allow the computing device 700 to access the server 140 to update the dialog simulator and/or download one or more new software products associated with the dialog simulation service. For example, new character definitions, new phrases and new state change types may be downloaded from server 140 over network 160 with the assistance of a subscription manager or dialog server.

Moreover, the network interface 750 optionally allows the computing device 700 to communicate with other computing devices, for example, via the communication network 160. In some examples, transceiver 460 may be integrated with network interface 750 or vice versa.

FIG. 7 is merely an example, which should not unduly limit the scope of the claims herein. It is to be understood that the specific designation for the computing device 700 is provided as an example and is not to be construed as limiting the computing device to specific numbers, types, or arrangements of modules and/or components of the computing device. The computing device 700 is optionally implemented by way of at least one of: a mobile phone, a smart telephone, an MID, a tablet computer, a UMPC, a phablet computer, a PDA, a web pad, a PC, a handheld PC, a laptop computer, a desktop computer, an NAS device, a large-sized touch screen with an embedded PC, and an interactive entertainment device, such as a game console, a TV set and an STB. A person skilled in the art will recognize many variations, alternatives, and modifications of embodiments of the present disclosure.

Figure 8:
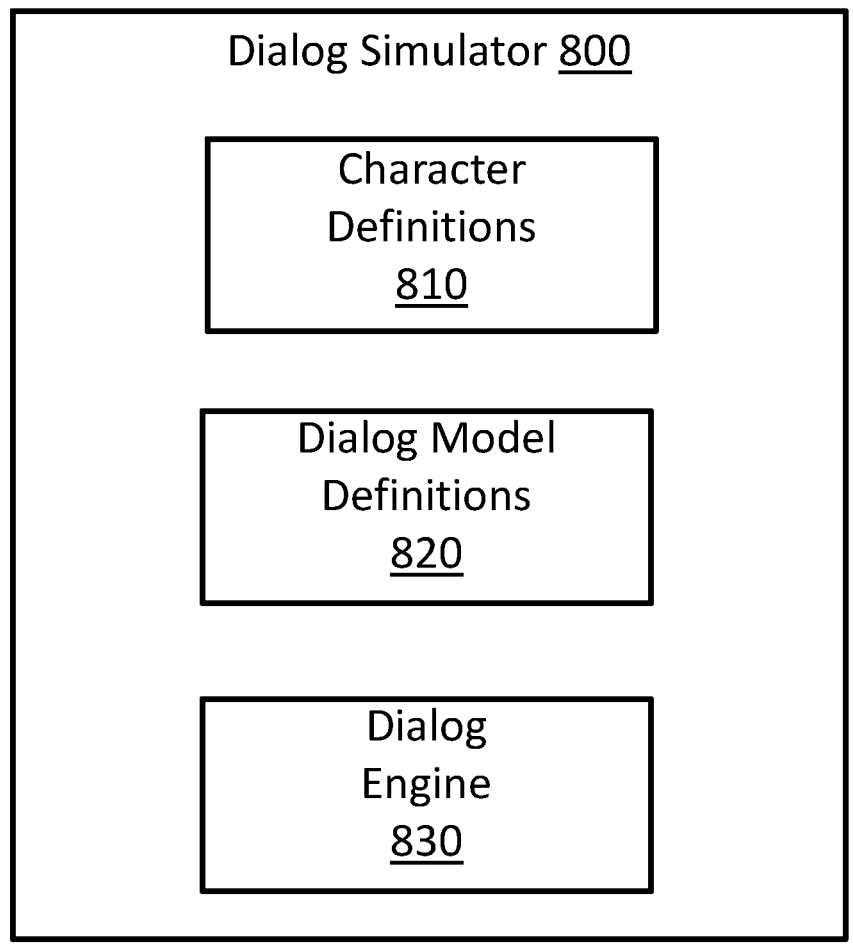
FIG. 8 schematically illustrates an example dialog simulator configured for installation on a computer useable as part of a dialog simulation system.

FIG. 8 schematically illustrates an example dialog simulator configured for installation on a computer useable as part of a dialog simulation system. The dialog simulator 800 could be implemented as the dialog simulator 716, and vice versa. Dialog simulator 800 includes computer-readable definitions 810 of each of a plurality of unique characters in terms of a plurality of phrases each weighted according to one or more phrase type weights and computer-readable definitions 820 of each of a plurality of dialog models in terms of state change type weights, character indices and phrase types. Character definitions and dialog model definitions have been described above with reference to FIGS. 3-6.

A dialog engine 830 has computer readable instructions for producing a synthetic, simulated or artificial dialog. The dialog engine 830 is in charge of selecting which dialog model, among feasible dialog models, is active. Feasible dialog models are those in which all characters selected for a dialog have at least one phrase with non-zero weight for the phrase types defined in the dialog model. Upon execution by a processor such as that described with reference to FIG. 7, dialog simulator 800 and, in particular dialog engine 830 is configured to cause the processor to, record type of a state change. If the change of state is associated with one or more characters, these characters may thereby be selected for contributing to a dialog.

In a simple example, characters to be speaking are selected according to the two characters in closest proximity either within a physical environment or a virtual environment. However, dialog models involving three or more characters may be implemented. The dialog engine 830 may also monitor the proximity of the characters and interrupt the dialog model if the proximity of the characters changes.

The sequence of dialog models selected may be random or dialog models that fit trends in state changes or dialog models called for in a given adventure may be preferentially selected. For example, if proximity of characters is being tracked, approaching characters, departing characters, characters in the vicinity of another character or a given location or characters being thrown may prompt selection of dialog models reflecting one or more of these states. In this scenario, the dialog engine 830 is configured to identify one or more dialog models of the plurality which have non-zero state change type weights corresponding to the recorded state change type, select one of the identified dialog models probabilistically with influence from the non-zero state change type weights and map one or more unique characters of the plurality to the character indices of the selected dialog model.

The state change type weights may be motion type weights and the processor, in order to record a state change type, may correspondingly be further configured to record a motion type associated with one or more of the plurality of unique characters and to identify one or more dialog models with non-zero motion type weights corresponding to the recorded motion type. In an example, recording the state change type may involve the processor monitoring a sensor or transceiver coupled with one or more of the plurality of characters.

Dialog models may also have associated weighting factors as described above with reference to FIGS. 4-6. For example, a dialog model that is similar to other models may be weighted lower such that similar models do not dominate the sequence of selected dialog models. Alternatively, dialog models that are essentially scripted interchanges between two characters might be weighted higher to increase their odds of being selected when the characters for which a script exist have been selected.

The dialog engine 830 is in charge of which phrases of a given type the mapped characters will speak when the selected dialog model prescribes the speaking character to speak a particular phrase type. Thus, dialog engine 830 is configured to identify one or more phrases defined in the one or more mapped unique characters which have non-zero phrase type weights corresponding to the phrase types of the selected dialog model and to select, for each phrase type defined in the selected dialog model, at least one of the phrases defined in the one or more mapped unique characters probabilistically with influence from the non-zero phrase type weights.

The dialog engine 830 is then configured to send the selected phrases to an output configured to present the selected phrases in a sequence defined by the selected dialog model. In an example, the sequence of phrases include pre-recorded audio and the output is an audio speaker configured to present the sequence of pre-recorded phrases audibly.

In an example, the dialog model 820 defines the next character to speak as the cowboy, the dialog model 820 defines the phrase type to be spoken as a request for sympathy, and the character definitions define a cowboy with three phrases having non-zero requestSympathy weights: "I've been feeling a bit blue lately"=4, "My Isabel says she won't be coming back"=6, and "I was thrown from my horse"=2. The dialog engine 830 may add the weights to yield twelve and then generate a random number between zero and twelve. If the randomly generated number is less than four, the cowboy would output the phrase "I've been feeling a bit blue lately", if the randomly generated number is between four and ten, the cowboy would output the phrase "My Isabel says she won't be coming back" and if the number is between ten and twelve the cowboy would output the phrase "I was thrown from my horse." Of course, other algorithms for selecting a phrase may be employed.

In a video game environment which is understood to be virtual, dialog simulator 800 allows a large number of non-player characters to interact with one another beyond the typical "barks" uttered by non-player-characters as they pass another character such as "Hi" or "stay out of my way." Known methods for allowing characters to interact in a meaningful way require full scripting of an interaction and recording of unique phrases to support the interaction. Using disclosed systems and methods, a relatively small number of phrases can be used to enable interaction between non-player characters. For example, a few dozen phrases may allow hundreds or potentially thousands of non-player characters to interact with one another.

A significant advantage of the disclosed dialog simulation is that the character's interactions can evolve and be updated. The dialog model definitions and character definitions stored on a computing device implementing the dialog simulator 800 can be updated over the internet by connecting to a subscription manager on a server in the cloud which can serve appropriate dialog models from a database of dialog models to be stored in a local dialog model cache on the computing device. Premium content or age appropriate content for a character may be sold and or authorized separately and managed by the subscription manager or dialog server arranged to track which users have access to which content.

The subscription manager and/or dialog server may send requested characters from a database of characters to a local character cache. In this manner a large number of characters can be managed and regularly updated over the internet through a writer's interface and only the requested characters and dialog models feasible for those characters need be downloaded to the local cache. In an example, a payment may be made in order to download or otherwise store requested characters or dialog models to the local character cache or local dialog model cache.

It should be noted that dialog simulator 800 may be arranged differently so as to include modules not disclosed here, so that two or more of character definitions 810, dialog model definitions 820 and dialog engine 830 are combined or so that tasks of one or more of the character definitions 810, the dialog model definitions 820 and the dialog engine 830 are the responsibility of one or more of the other of the character definitions 810, the dialog model definitions 820 and the dialog engine 830 or the responsibility of one or more additional modules.

Figure 9:
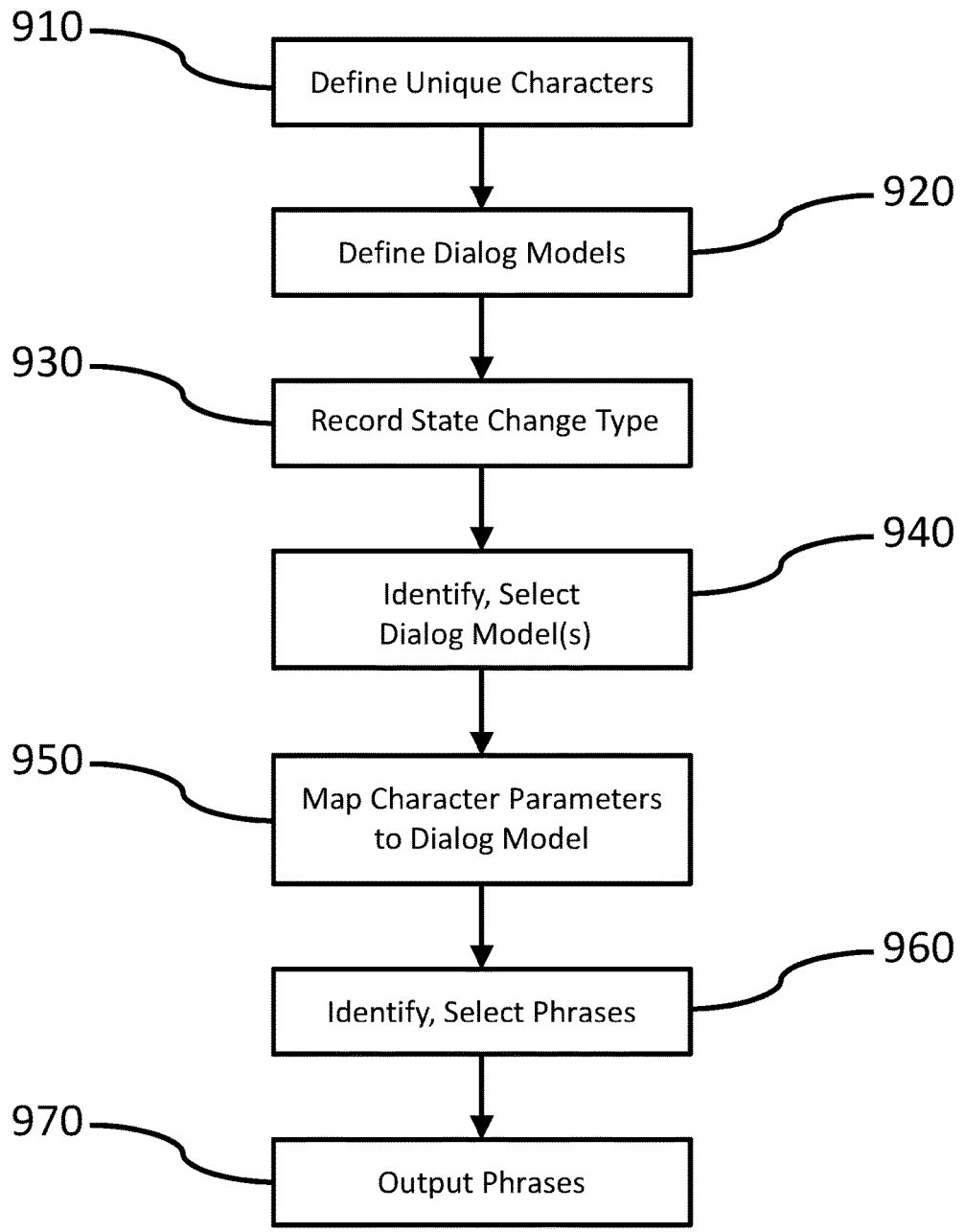
FIG. 9 illustrates a flow diagram of an example method for producing a simulated dialog in accordance with disclosed embodiments.

FIG. 9 illustrates a flow diagram of an example method for producing a simulated dialog in accordance with disclosed embodiments. The method is depicted as a collection of actions in a logical flow diagram, which represents a sequence of actions that may be implemented in hardware, software, or a combination thereof. In an example, the computing device of FIG. 7, the dialog simulator of FIG. 8 and components of the network environment of FIG. 1 cooperate to perform actions of the method.

The method includes defining, at 910, each of a plurality of unique characters in terms of a plurality of phrases each weighted according to one or more phrase type weights. Defining the plurality of unique characters may further include defining the characters in terms of descriptive metadata (FIG. 3). The method further includes defining, at 920, each of a plurality of dialog models in terms of state change type weights, character indices and phrase types. In an example, actions 910 and 920 are performed in advance, such as by the method described with respect to FIG. 2.

At 930 a state change type is recorded. A state change may occur at any of a number of levels including but not limited to at the level of one or more characters and at the level of a simulation environment. For example, the state of a character may change from moving to stationary, the state of an environment may change from daytime to night time or from desert surroundings to mountainous surroundings. When characters are represented physically, a state of a character may include but is not limited to a move closer to or further from one or more other characters or objects and proximity to one or more other characters or objects.

At 940 one or more dialog models of the plurality are identified which have non-zero state change type weights corresponding to or matching with the recorded state change type and one of the identified dialog models are selected probabilistically with influence from the non-zero state change type weights. Probabilistic selection may be made in accordance with a weighted random selection process mentioned above. It should be noted that when a character experiences a state change, the character may influence identification and selection of the dialog model since the dialog model should include one or more phrase types defined for the character. Otherwise, the character may not be able to output phrases.

At 950 one or more unique characters of the plurality are mapped to the character indices of the selected dialog model as described in greater detail above. At 960 one or more phrases defined in the one or more mapped unique characters are identified which have non-zero phrase type weights corresponding to the phrase types of the selected dialog model and for each phrase type defined in the selected dialog model, at least one of the plurality of phrases defined in the one or more mapped unique characters are selected probabilistically with influence from the non-zero phrase type weights in accordance with a weighted random selection process. At 970 the selected phrases are output in a sequence defined by the selected dialog model in accordance with the character indices.

Dialog models and characters may be further influenced by "adventures" which enrich dialog with context by defining a dialog simulation environment. An adventure may add, subtract or otherwise change a set of phrases defined for a character; may add, subtract or otherwise change character indices of dialog models; may allow for different responses to changes of state; or may influence a sequence in which dialog models are called.

Figure 10:
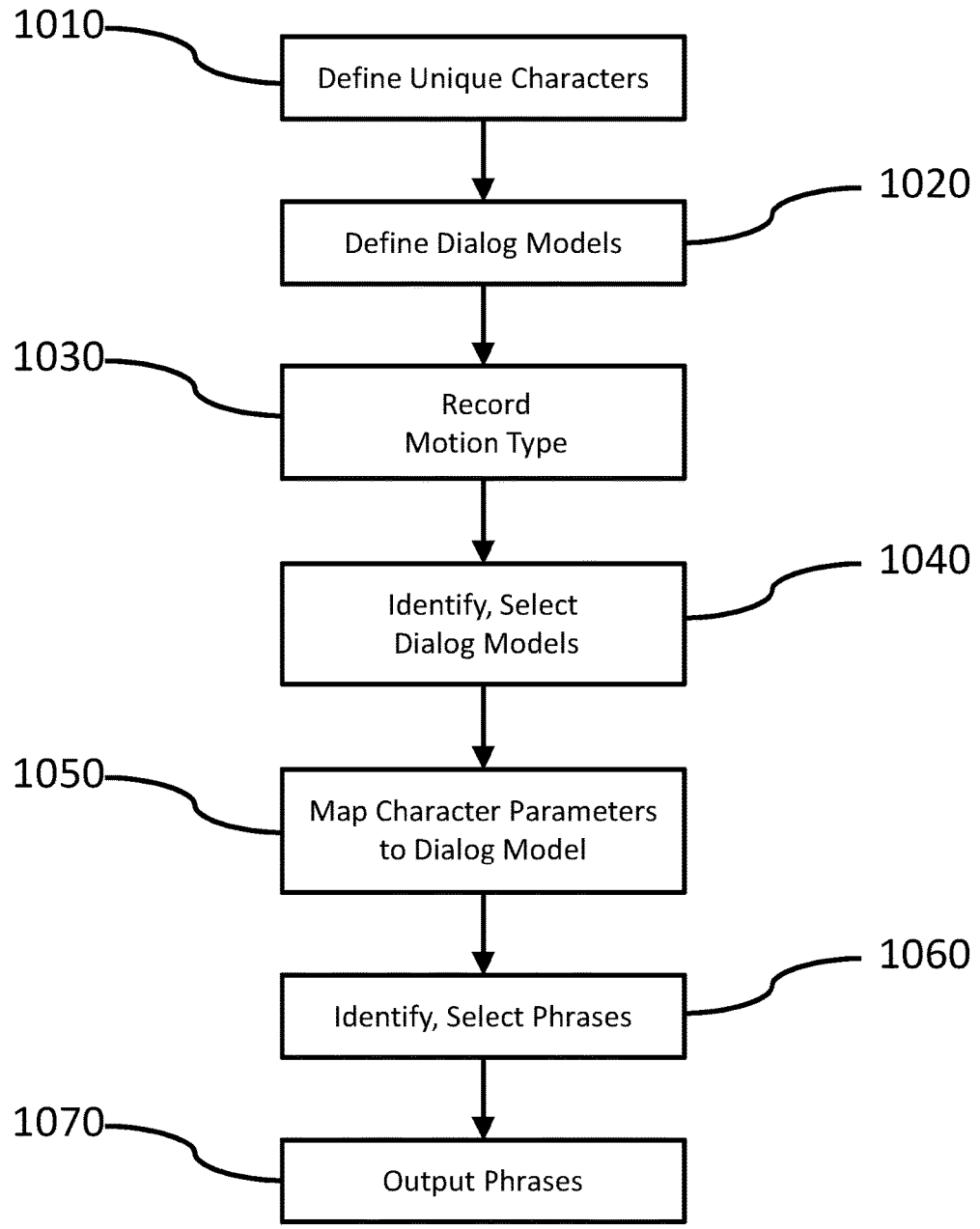
FIG. 10 illustrates a flow diagram of another example method for producing a simulated dialog in accordance with disclosed embodiments.

A movement of a character or proximity of a character to a given location may be used to select a dialog model. FIG. 10 illustrates a flow diagram of another example method for producing a simulated dialog in accordance with disclosed embodiments. The method produces a simulated dialog in response to detected proximity or motion. At 1010 the method includes, defining, each of a plurality of unique characters in terms of a plurality of phrases each weighted according to one or more phrase type weights and defining, at 1020, each of a plurality of dialog models in terms of motion type weights, character indices and phrase types. In an example, character definitions will further include descriptive metadata (FIG. 3).

In an example implementation of the disclosed dialog simulation service, each unique character defined according to a plurality of phrases, corresponding phrase types and phrase type weights may be associated with a toy or other object in order to represent the characters physically. The association may be made by pairing each unique character with an identifier code of the associated object. For example, a unique object identifier broadcast by a transceiver coupled with the object may be associated with a character definition in a memory such as 710 such that any signal sent from the transceiver would be associated with the character.

In an example use case, an end user purchases one or more characters in the form of a transceiver with a unique identifier. The user downloads the dialog simulator to a computing device. The dialog simulator may then simulate dialog in response to states or state changes reflected in a real time proximity map or array. The user may control which characters contribute to the dialog by changing states of the characters. For example, movement of the characters farther apart or closer together, as frequently observed in a traditional doll based play pattern, may be reflected in the proximity map or array.

At 1030, a motion type is recorded. For example, an associated object may move towards or away from one or more other objects, may move within a pre-defined proximity to one or more other objects, or may change orientation. A toy or other object may also exhibit a "no motion" type.

Determining and/or recording motion type may include monitoring a sensor coupled with one or more of the plurality of toys. For example, proximity, motion or orientation of an object such as a toy may be derived from data transmitted by a transceiver of the object and associated with a character already paired with the unique identifier code of the object. This may, in turn, affect a state of the dialog simulation environment.

In another embodiment a motion detector, tilt switch, inertial measurement unit or other motion sensing device is used to detect specific movements of the toy such as shaking or throwing. Such motions may be integrated into the dialog engine to allow the user to express like or dislike for certain phrases and to change the popularity weights of those phrases for future dialogs.

At 1040, one or more of the dialog models are identified which have non-zero motion type weights corresponding to or matching with the recorded motion type and one of the identified dialog models is selected probabilistically with influence from the non-zero motion type weights. Probabilistic selection may be made in accordance with a weighted random selection process described above. As mentioned above, when the motion is detected in a character, the character may influence which dialog model is identified and selected. Once a dialog model has been selected, one or more unique characters of the plurality are mapped to the character indices of the selected dialog model at 1050.

At 1060 one or more phrases defined in the one or more mapped unique characters are identified which have non-zero phrase type weights corresponding to the phrase types of the selected dialog model and, for each phrase type defined in the selected dialog model, at least one of the plurality of phrases defined in the one or more mapped unique characters is selected probabilistically with influence from the non-zero phrase type weights. At 1070, the selected phrases are output in a sequence defined by the selected dialog model. In an example, a sequence of phrases defined in the first character and the one or more other characters is output in an audible sequence of pre-recorded phrases.

When a user has control over proximity and/or motion of characters, selections made based upon motions or proximity of characters enable the user to control which characters are speaking. It is expected that most users will switch up the speaking characters frequently to thereby frequently change topic and make any lack of context among character phrases in unscripted dialog models less noticeable. The result is more realistic dialogs.

The actions 1010 to 1070 are only illustrative and other alternatives can also be provided where one or more actions are added, one or more actions are removed, or one or more actions are provided in a different sequence without departing from the scope of the claims herein.

As discussed throughout, embodiments of the disclosure provide a computer program product that includes a non-transitory or non-transient computer-readable storage medium storing computer-executable code for a dialog simulation service. The code, when executed, is configured to perform actions described in conjunction with the above methods as described with reference to FIGS. 9 & 10. As actions of the disclosed methods may be provided in different sequences, so the computer-executable code may be configured to provide a service having a different sequence of actions from those illustrated in FIGS. 9 & 10. In some examples, the code may be downloaded from a software application store, for example, from an "App store", to a computing device.

Audio output may be enabled for the characters. In one cost-preserving example of an audio-enabled system, phrases may emanate from the speakers on a central computing device such as a tablet, laptop, smart phone, or computer. In another example, one or more toys or other objects may behave like slaved Bluetooth speakers to a central computer such that the phrase audio is transmitted wirelessly from the central computing device to the individual objects and the audio is generated using a speaker in the objects. In yet another example, one of the objects may include a higher performance embedded computer system able to connect to the internet. The object may be a larger variety toy such as a doll house and, with computer functionality built in, a separate computer is not necessary.

In one embodiment all dialog content is created to be suitable for children at a "G" or "PG" level. In another embodiment content is provided at different maturity levels including adult content that is "R" rated for association with figurines, that appeal to adult sensibilities.

Figure 11:
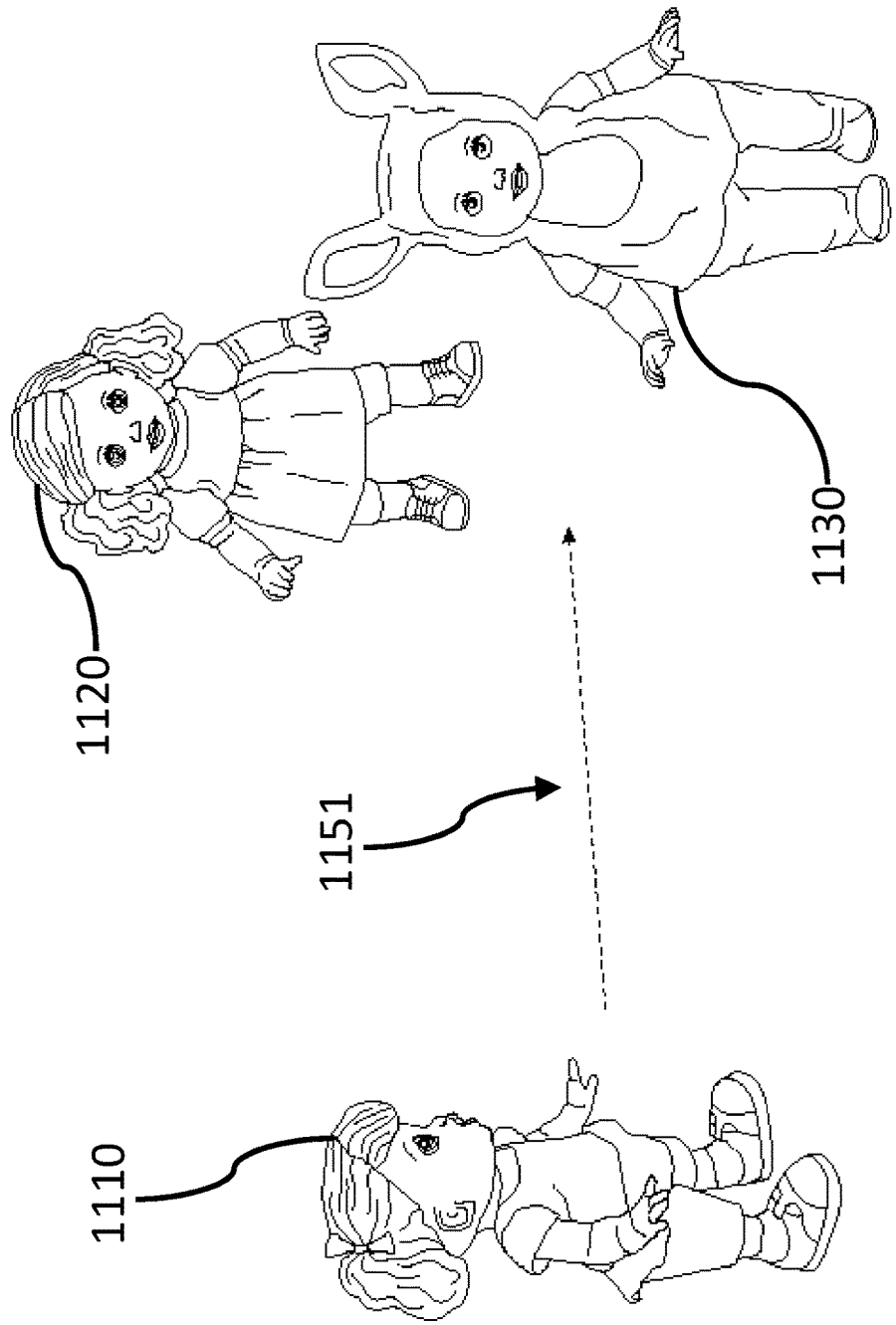
FIG. 11 illustrates an example advance of a first toy relative to second and third toys.

Either or both of proximity and motion may be used to select which characters converse. FIG. 11 illustrates an example advance of a first toy relative to second and third toys. With each of toys 1110, 1120 and 1130 associated with a unique character definition, advance of toy 1110 may be recorded as a state change within the simulated dialog environment. Accordingly, a dialog model defined in terms of an "advancing" state change type is selected with influence from the state change type weight. If, for example, the dialog model described with reference to FIG. 4 were selected, a greeting statement chosen from the available advancing statement phrases defining the character associated with toy 1110 would be output to simulate a dialog phrase being spoken by toy 1110.

Figure 12:
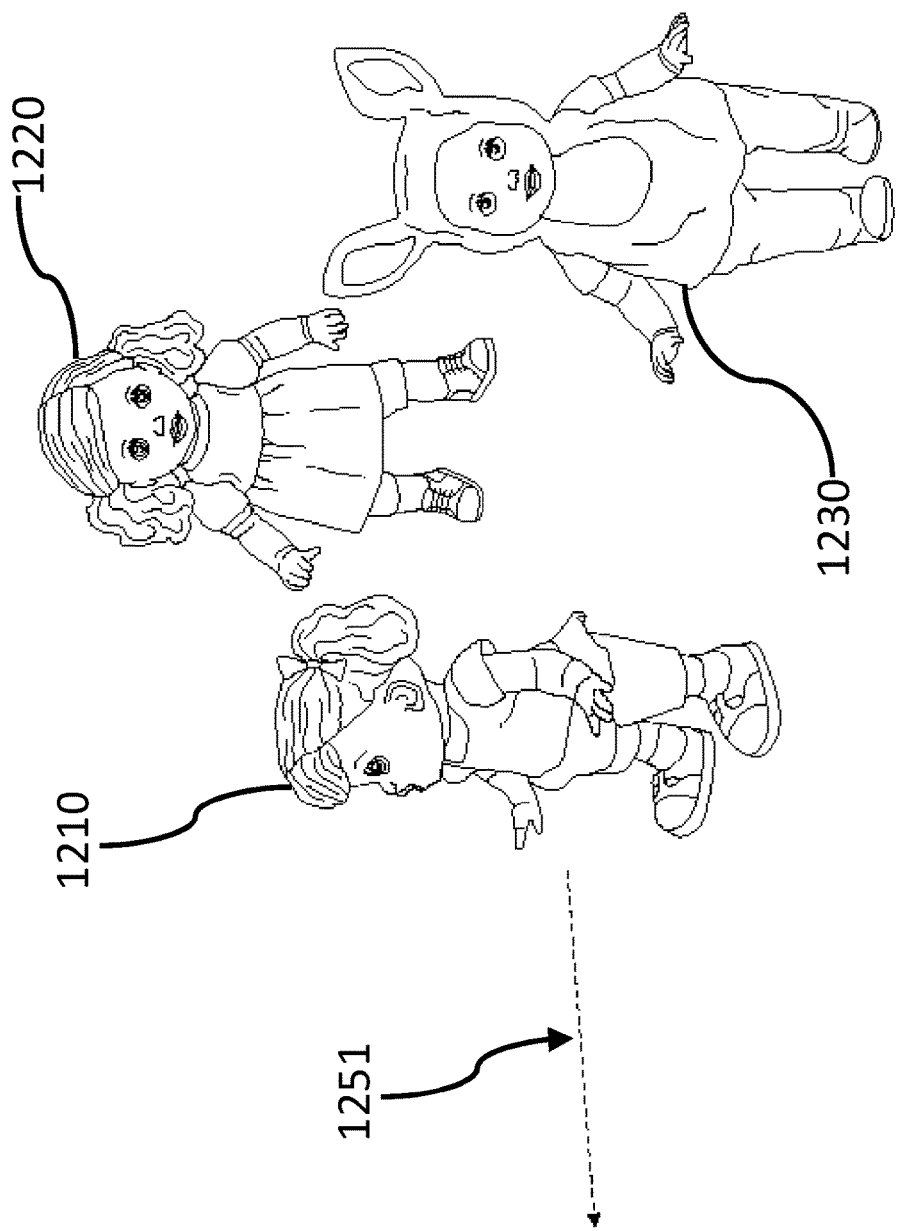
FIG. 12 illustrates an example retreat of a first toy relative to second and third toys.

An end user may cause one character to retreat from one or more other characters thereby breaking a conversation mid-stream and triggering a dialog, phrase or other response that is appropriate to a character leaving mid-conversation. FIG. 12 illustrates an example retreat of a first toy relative to second and third toys. With each of toys 1210, 1220 and 1230 associated with a unique character definition, retreat of toy 1210 from a congregation with toys 1220 and 1230 may be recorded as a different type of state change of the simulated dialog environment. Accordingly, a dialog model defined in terms of a "retreating" state change type is selected with influence from the state change type weight. If, for example, the dialog model described with reference to FIG. 5 were selected, a goodbye phrase would be chosen from the available goodbye phrases defining the character associated with toy 1210. Additionally, according to the dialog model defined in FIG. 5, toy 1220 may issue an insult phrase chosen from the available goodbye phrases defining the character associated with toy 1220.

Further, with filtering of a real time proximity map/array or an optional motion detector it is possible to detect when a character has been thrown rather than just "walked" from the physical grouping of characters, a dialog model appropriate to seeing a colleague fly though the air may be elicited.

Figure 13:
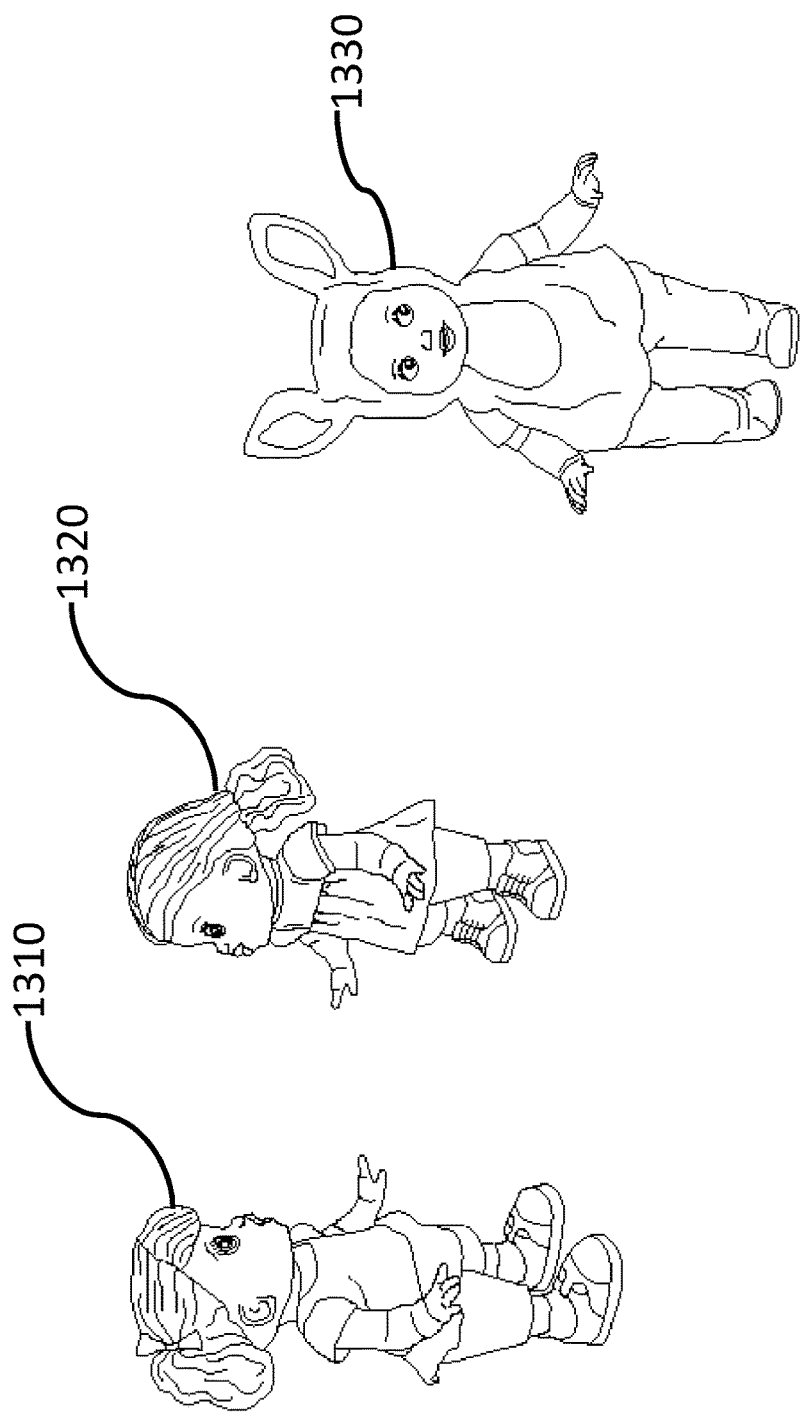
FIG. 13 illustrates example first and second toys facing towards one another while an example third toy faces away from the first and second toys.

FIG. 13 illustrates example first and second toys facing towards one another while an example third toy faces away from the first and second toys. With each of toys 1310, 1320 and 1330 associated with a unique character definition, orientation of toys 1310 and 1320 towards one another may be recorded as a state or state change of the simulated dialog environment. In this scenario, only characters associated with toys 1310 and 1320 will be active in a dialog produced by an identified and selected dialog model. For example, one or more phrases defining the character associated with toy 1310 and one or more phrases defining the character associated with toy 1320 will be output in a sequence defined within the dialog model while any character associated with toy 1330 refrains from outputting phrases.

Additionally, rather than sensing which two characters are closest, a proximity array may be used to detect when a character is in or near a play structure or other non-speaking object, such as a doll house or a vehicle, when the non-speaking object is instrumented with a transceiver configured to send a signal which yields kinematic information. In an example, some dialog models might only be used if the characters are in proximity to the non-speaking objects and include phrase types that have a context such appropriate to the object(s).

Embodiments of the present disclosure are susceptible to being used for various purposes, including, though not limited to, enabling users to cause verbal interaction between characters. Modifications to embodiments of the present disclosure described in the foregoing are possible without departing from the scope of the present disclosure as defined by the accompanying claims. Expressions such as "including", "comprising", "incorporating", "consisting of", "have", "is" used to describe and claim the present disclosure are intended to be construed in a non-exclusive manner, namely allowing for items, components or elements not explicitly described also to be present. Reference to the singular is also to be construed to relate to the plural.

What is claimed is:

1. A method of producing simulated dialog, comprising:
defining each of a plurality of unique characters in terms of a plurality of phrases, wherein each of the plurality of phrases is weighted according to one or more phrase type weights;
defining each of a plurality of dialog models in terms of state change type weights, character indices and phrase types;
in a memory, associating each of the plurality of unique characters with one of a plurality of unique identifier codes, wherein each of the plurality of unique identifier codes is broadcast by one of a plurality of transceivers, wherein each of the plurality of transceivers is coupled with one of a plurality of toys;
recording a state change type of the plurality of transceivers;
identifying one or more of the dialog models which have non-zero state change type weights corresponding to the recorded state change type;
selecting one of the identified dialog models probabilistically with influence from the non-zero state change type weights;
associating each of the plurality of toys with one of the plurality of unique characters; mapping one or more of the unique of the characters to the character indices of the selected dialog model;
for each of the plurality of mapped unique characters, identifying one or more phrases defined therein which have non-zero phrase type weights corresponding to the phrase types of the selected dialog model;
for the phrase types defined in the selected dialog model, selecting, probabilistically with influence from the non-zero phrase type weights, a plurality of the identified phrases; and
outputting the selected phrases in a sequence defined by the selected dialog model.

2. The method as set forth in claim 1, wherein defining each of a plurality of dialog models in terms of state change type weights, character indices and phrase types further comprises defining each of the plurality of dialog models in terms of motion type weights; and
wherein recording a state change type further comprises recording a motion type.

3. The method as set forth in claim 2, further comprising providing a branching storyline by linking two or more of the dialog models together in a sequence in response to two or more consecutively recorded motion types corresponding with the linked dialog models.

4. The method as set forth in claim 2, wherein identifying one or more dialog models with non-zero state change type weights corresponding to the recorded state change type further comprises identifying one or more dialog models with non-zero motion type weights corresponding to the recorded motion type.

5. The method as set forth in claim 1, wherein recording the state change type further comprises monitoring input from the plurality of transceivers or from sensors coupled with one or more of the plurality of toys.

6. The method as set forth in claim 1, wherein outputting the selected phrases in the sequence further comprises outputting an audible sequence of pre-recorded phrases.

7. The method as set forth in claim 1, wherein defining each of a plurality of unique characters in terms of a plurality of phrases each weighted according to one or more phrase type weights further comprises defining the plurality of unique characters in terms of descriptive metadata.

8. The method as set forth in claim 1, further comprising transmitting, over a communications network, definitions of the defined plurality of unique characters including the plurality of phrases and one or more phrase type weights.

9. The method as set forth in claim 1, further comprising transmitting, over a communications network, definitions of the defined dialog models including the state change type weights, character indices and phrase types.

10. A system for producing simulated dialog, comprising:
a memory having recorded thereto:
   a dialog simulator comprising:
      computer-readable definitions of each of a plurality of unique characters in terms of a plurality of phrases, wherein each of the plurality of phrases is weighted according to one or more phrase type weights,
      computer-readable definitions of each of a plurality of dialog models in terms of state change type weights, character indices and phrase types, and
      a dialog engine including computer readable instructions for producing a simulated dialog;
a processor configured to, according to computer readable instructions of the dialog engine:
   in the memory, associate each of the plurality of unique characters with one of a plurality of unique identifiers, wherein each of the plurality of unique identifiers is broadcast by one of a plurality of transceivers, wherein each of the plurality of transceivers is coupled with one of a plurality of toys,
   record a state change type of the plurality of transceivers,
   identify one or more of the dialog models which have non-zero state change type weights corresponding to the recorded state change type of the simulator,
   select one of the identified dialog models probabilistically with influence from the non-zero state change type weights,
   associate each of the plurality of toys with one of the plurality of unique characters, map one or more of the unique characters to the character indices of the selected dialog model,
   for each of the plurality of mapped unique characters, identify one or more phrases defined therein which have non-zero phrase type weights corresponding to the phrase types of the selected dialog model, and
   for the phrase types defined in the selected dialog model, select probabilistically with influence from the non-zero phrase type weights, a plurality of the identified phrases; and
an output configured to present the selected phrases in a sequence defined by the selected dialog model.

11. The system as set forth in claim 10, wherein:
the state change type weights further comprise motion type weights; and
in order to record a state change type, the processor is further configured to record a motion type associated with one or more of the plurality of unique characters.

12. The system as set forth in claim 11, wherein, to provide a branching storyline, the processor is further configured to link two or more of the dialog models together in a sequence in response to two or more consecutively recorded motion types corresponding with the linked dialog models.

13. The system as set forth in claim 11, wherein, in order to identify one or more dialog models with non-zero state change type weights corresponding to the recorded state change type, the processor is further configured to identify one or more dialog models with non-zero motion type weights corresponding to the recorded motion type.

14. The system as set forth in claim 10, wherein, in order to record a state change type, the processor is further configured to monitor input from the plurality of transceivers or from sensors coupled with one or more of the plurality of toys.

15. The system as set forth in claim 10, wherein the phrases are pre-recorded and the output is an audio speaker configured to present the pre-recorded phrases audibly, in the sequence.

16. The system as set forth in claim 10, wherein the definitions of each of the plurality of unique characters further comprise descriptive metadata.

17. The system as set forth in claim 10, further comprising a dialog server configured to transmit to the memory, over a communications network, the definitions of each of the plurality of unique characters including the plurality of phrases and one or more phrase type weights.

18. The system as set forth in claim 10, further comprising a dialog server configured to transmit to the memory, over a communications network, the definitions of the plurality of dialog models including the state change type weights, character indices and phrase types.

* * * * *